US006541078B2

(12) United States Patent
Rekowski et al.

(10) Patent No.: US 6,541,078 B2
(45) Date of Patent: Apr. 1, 2003

(54) PROCESS FOR COATING SUBSTRATES

(75) Inventors: Volker Rekowski, Bochum (DE); Oliver Reis, Witten (DE); Martin Wulf, Wuppertal (DE)

(73) Assignee: E. I. du Pont de Nemours and Company, Wilmington, DE (US)

( * ) Notice: Subject to any disclaimer, the term of this patent is extended or adjusted under 35 U.S.C. 154(b) by 0 days.

(21) Appl. No.: 09/850,711

(22) Filed: May 9, 2001

(65) Prior Publication Data

US 2003/0031804 A1 Feb. 13, 2003

(51) Int. Cl.[7] .................................................. C08F 2/48
(52) U.S. Cl. ................... 427/508; 427/514; 427/407.1; 427/409
(58) Field of Search ................ 427/489, 492, 427/508, 512, 514, 532, 553, 557, 595, 372.2, 384, 385.5, 388.1, 402, 407.1, 409, 417, 421, 428, 429, 430.1

(56) References Cited

U.S. PATENT DOCUMENTS

| 5,932,282 A | | 8/1999 | Diener et al. | |
|---|---|---|---|---|
| 6,136,449 A | * | 10/2000 | Furuuchi et al. | 427/407.1 |
| 6,280,800 B1 | * | 8/2001 | Thiele et al. | 427/180 |
| 6,333,077 B1 | * | 12/2001 | Maag et al. | 106/285 |
| 6,432,490 B1 | * | 8/2002 | Rekowski et al. | 427/508 |

FOREIGN PATENT DOCUMENTS

| DE | 19913442 A1 | | 9/2000 |
|---|---|---|---|
| DE | 19913446 A1 | | 9/2000 |
| DE | 19709560 C1 | | 12/2001 |
| DE | 19818735 A1 | | 12/2001 |
| WO | WO 98/00456 | | 1/1998 |
| WO | WO 99/41323 | * | 8/1999 |

* cited by examiner

*Primary Examiner*—Michael Barr
*Assistant Examiner*—Rebecca A. Blanton
(74) *Attorney, Agent, or Firm*—Steven C. Benjamin

(57) ABSTRACT

The invention is directed to a process for coating substrates by applying at least one coating composition to an optionally precoated substrate and then curing the coating layer(s) thus obtained, wherein at least one of the coating layers is produced from a coating composition which contains a binder system having olefinic double bonds capable of free-radical polymerization and having reactive functional groups within the meaning of addition and/or condensation reactions, the resin solids of the coating composition having a C=C-equivalent weight from 300 to 10,000, preferably from 300 to 8,000, and curing of this (these) coating layer(s) is carried out by irradiation with NIR radiation in the wave length range 760–1500 nm.

11 Claims, No Drawings

PROCESS FOR COATING SUBSTRATES

FIELD OF THE INVENTION

The invention relates to a process for coating substrates in which one or more coating layers are applied and cured by near infra red (NIR) radiation. The process can be used in the application of automotive and industrial coatings.

DESCRIPTION OF RELATED ART

It is known to use coating compositions curable by UV (ultraviolet light) radiation in automotive and industrial coating. Coating compositions based on binders capable of free-radical polymerization are used in particular. These coating compositions generally contain photoinitiators. Coating compositions curable by UV radiation are described, for example, in DE-A-198 18 735 and U.S. Pat. No. 5,932,282.

A known deficiency of UV-curable coatings is that, particularly in the case of three-dimensional objects to be coated, insufficient curing takes place in shadow regions, that is, in areas which are unexposed or underexposed to UV radiation. Attempts have been made to remedy this problem by the use of so-called dual cure systems, that is, binder systems that cure both by UV irradiation and by means of a further cross-linking mechanism. Depending on the binder system, however, two process steps are sometimes required with these systems for complete curing, namely, UV irradiation and in addition a thermal curing phase. Examples of dual cure systems are described in WO-A-98/00456 and DE-A-197 09 560.

Another general deficiency of UV curable coating compositions is that yellowing of the resulting coating layers occurs after UV irradiation of coating compositions containing photoinitiators. The latter precludes the use of UV curable coating compositions particularly as a clear coat or a pale, e.g., white-pigmented top coat.

UV irradiation and the use of photoinitiators may be avoided by thermally initiated curing of the binders capable of free-radical polymerization. Coating compositions based on binders capable of free-radical polymerization that are cured thermally in the usual way in combination with thermal radical initiators have the disadvantage, however, that insufficient curing of the coating layers, if any, can be obtained if radical scavengers are used, e.g., light stabilizers (light protecting agents) based on HALS products (HALS= hindered amine light stabilizer). The HALS products, acting as radical scavengers, impede free-radical polymerization of the binders. Light stabilizers are a necessary constituent in the production of suitable coating compositions for external applications and for certain interior applications where protection from the influence of light is required.

Moreover, it is known to dry and to cure coating layers with NIR radiation in the context of multi-layer coating. Such processes are described, for example, in DE-A-199 13 446 and DE-A-199 13 442. Binders used here are one-component, physically or oxidatively drying binder systems and two-component binder systems, for example, based on a hydroxyl and a polyisocyanate component or an epoxide and a polyamine component. It is also possible to use binders curable by high-energy radiation, preferably binders capable of free-radical polymerization. In the latter case, photoinitiators are contained in the coating compositions and irradiation with UV rays takes place in addition to NIR irradiation.

This invention provides a process for coating substrates that makes it possible to obtain, using coating compositions based on binder systems capable of free-radical polymerization, low-yellowing, fully curable coatings suitable for external applications. The coatings obtained are capable of curing rapidly with NIR radiation and have sufficient hardness and a good surface quality.

SUMMARY OF THE INVENTION

This invention is directed to a process for coating substrates by applying at least one coating composition to an optionally precoated substrate and then curing the coating layer(s) thus obtained, wherein at least one of the coating layers is produced from a coating composition that contains a binder system having olefinic double bonds capable of free-radical polymerization and having reactive functional groups within the meaning of addition and/or condensation reactions, the resin solids of the coating composition having a C=C-equivalent weight from 300 to 10,000, preferably from 300 to 8,000, and curing of this (these) coating layer(s) is carried out by irradiation with NIR radiation in the wave length range 760–1500 nm.

DETAILED DESCRIPTION OF THE EMBODIMENTS

Surprisingly, it was found that, as a result of the irradiation and curing according to the invention of coating compositions based on binder systems capable of free-radical polymerization and cross-linkable by addition and/or condensation reactions with NIR radiation, coatings are obtained that cure rapidly and completely, even in the presence of radical scavengers, e.g., light stabilizers based on HALS products. Complete curing of coating compositions based on binders capable of free-radical polymerization in combination with, e.g., light stabilizers based on HALS products could not be obtained hitherto with conventional thermal curing methods, e.g., in ovens by means of convection or induction drying.

The NIR radiation used according to the invention is short-wave infra-red radiation in the wave length range from about 760 to about 1500 nm, preferably 760 to 1200 nm. Radiation sources for NIR radiation include, for example, NIR radiation emitters that are able to emit radiation as a flat, linear or point source. NIR radiation emitters of this kind are available commercially (for example, from Adphos). These include, for example, high performance halogen radiation emitters with an intensity (radiation output per unit area) of generally more than 10 kW/m$^2$ to, for example, 15 MW/m$^2$, preferably from 100 kW/m$^2$ to 800 kW/m$^2$. For example, the radiation emitters reach a radiation emitter surface temperature (coil filament temperature) of more than 2000° K, preferably, more than 2900° K, e.g., a temperature from 2000 to 3500° K. Suitable radiation emitters have, for example, an emission spectrum with a maximum between 750 and 1200 nm.

The coating compositions which may be used in the process according to the invention can be cross-linked by chemical means both by free-radical polymerization of olefinic double bonds and by addition and/or condensation reactions of appropriate functional groups.

The olefinic double bonds capable of free-radical polymerization and the functional groups that react together in the manner of addition and/or condensation reactions may be contained, in principle, in the same binder and/or in separate binders.

The functional groups that react together in the manner of addition and/or condensation reactions will be referred to hereinafter as further reactive functional groups. They are reactive functional groups A and reactive functional groups B complementary to the latter. Reactive functional groups A and reactive functional groups B may be present in the same binder and/or in separate binders.

The following variants of the arrangement and combination of the olefinic double bonds and of further reactive functional groups A and B in the binders are possible, in principle:

1. Binders having olefinic double bonds+separate binders containing further reactive functional groups A and B in any combination;
2. Binders having olefinic double bonds and further reactive functional groups A+separate binders having olefinic double bonds and further functional groups B and/or separate binders having olefinic double bonds and further reactive functional groups A and B;
3. Binders having olefinic double bonds and further reactive functional groups A+ separate binders having further reactive functional groups B and optionally further reactive functional groups A;
4. Binders having olefinic double bonds and further reactive functional groups A and B.

In above variant 1, the further reactive functional groups A and B may be present in the same binder and/or in separate binders. The binders containing further reactive functional groups A and/or B are free from olefinic double bonds. The binders having olefinic double bonds are, in turn, free from further functional groups A and/or B. The following combinations of binders having reactive functional groups A and B are conceivable: binders with groups A and B; binders with groups A+ binders with groups B; binders with groups A and B+ binders with groups A or B; binders with groups A+ binders with groups B+ binders with groups A and B.

In principle, the three variants listed above may also be combined in any manner. For example, variant 2 may contain further binders which have only olefinic double bonds and/or may contain further binders which have only reactive functional groups A and/or B. Moreover, for example, variant 3 may contain further binders which have only olefinic double bonds and/or may contain further binders containing further reactive functional groups A.

The binders which may be used in the process according to the invention will be explained in more detail below on the basis of variants 1 to 4.

Variant 1

The coating compositions that may be used in the process according to the invention may contain one or more binders, according to variant 1, which contain no further functional groups apart from the olefinic double bonds capable of free-radical polymerization. Suitable binders having olefinic double bonds capable of free-radical polymerization include, for example, all the binders known to the skilled person which can be cross-linked by free-radical polymerization. These binders are prepolymers, such as, polymers and oligomers containing, per molecule, one or more, preferably, on average 2 to 20, particularly preferably, 3 to 10 olefinic double bonds capable of free-radical polymerization.

The polymerizable double bonds may be in the form of, for example, (meth)acryloyl, vinyl allyl, maleinate and/or fumarate groups.

(Meth)acryloyl and (meth)acrylic should be understood here and hereinafter to mean acryloyl and/or methacryloyl and acrylic and/or methacrylic, respectively.

Examples of prepolymers or oligomers include (meth) acryloyl-functional poly(meth)acrylates, polyurethane (meth)acrylates, polyester (meth)acrylates, unsaturated polyesters, polyether (meth)acrylates, silicone (meth) acrylates, epoxy (meth)acrylates, amino (meth)acrylates and melamine (meth)acrylates. The number-average molecular mass Mn of these compounds may be, for example, 500 to 10,000 g/mole, preferably, 500 to 5000 g/mole. The binders may be used on their own or in mixture.

Compounds containing double bonds capable of free-radical polymerization in the form of (meth)acryloyl groups may be obtained by conventional methods, for example, by reaction of di—or polyepoxides, glycidyl-functional polyesters, polyurethanes and/or poly(meth)acrylates with (meth)acrylic acid. These and other methods of preparation are described in the literature and are known to the skilled person.

The prepolymers may be used in combination with reactive thinners, that is, low molecular weight compounds capable of free-radical polymerization with a molecular mass below 500 g/mole. The reactive thinners may be mono-, di-or polyunsaturated. Examples of monounsaturated reactive thinners include: (meth)acrylic acid and esters thereof, maleic acid and half esters thereof, vinyl acetate, vinyl ether, substituted vinyl ureas, styrene, vinyl toluene. Examples of diunsaturated reactive thinners include: di(meth)acrylates, such as, alkylene glycol di(meth) acrylate, polyethylene glycol di(meth)acrylate, butane 1,3-diol di(meth)acrylate, vinyl (meth)acrylate, allyl (meth) acrylate, divinylbenzene, dipropylene glycol di(meth) acrylate, hexane diol di(meth)acrylate. Examples of polyunsaturated reactive thinners include: glycerol tri(meth) acrylate, trimethylolpropane tri(meth)acrylate, pentaerythritol tri(meth)acrylate, and pentaerythritol tetra(meth) acrylate. The reactive thinners may be used alone or in mixture.

The coating compositions, which may be used in the process according to the invention, may contain one or more binders according to variant 1 that contain functional groups cross-linkable by addition and/or condensation reactions and are free from olefinic double bonds capable of free-radical polymerization.

The addition and/or condensation reactions in the above mentioned meaning are cross-linking reactions in coatings chemistry known to the skilled person, such as, ring-opening addition of an epoxide group to a carboxyl group with the formation of an ester group and an hydoxyl group, the addition of an hydroxyl group to an isocyanate group with the formation of a urethane group, the addition of an optionally blocked amino group to an isocyanate group with the formation of a urea group, the reaction of an hydroxyl group with a blocked isocyanate group with the formation of a urethane group and dissociation of the blocking agent, the reaction of an hydroxyl group with an N-methylol group with dissociation of water, the reaction of an hydroxyl group with an N-methylol ether group with dissociation of the etherification alcohol, the transesterification reaction of an hydroxyl group with an ester group with dissociation of the esterification alcohol, the transurethanization reaction of an hydroxyl group with a carbamate group with alcohol dissociation, the reaction of a carbamate group with an N-methylol ether group with dissociation of the etherification alcohol, the addition of an amino group to an epoxy group with ring opening and formation of a secondary hydroxyl group, and the addition reaction of an amino group or of an aceto acetyl group to a group with olefinically unsaturated double bonds, e.g., an acryloyl group.

Suitable binders that contain functional groups cross-linkable by addition and/or condensation reactions and are free from olefinic double bonds capable of free-radical polymerization include conventional binders and cross-linking agents of the kind known to the coatings skilled person for the appropriate application. The binders must merely be provided with the appropriate functional groups. Examples of suitable functional groups include the following: hydroxyl, isocyanate (optionally blocked), N-methylol, N-methylolether, ester, carbamate, epoxy, amino (optionally blocked), acetoacetyl, carboxyl groups and groups having olefinic double bonds, e.g., acryloyl groups. The functional groups that react with one another may be contained in the same binder and/or in separate binders. In the case of one-component binders, for example, OH groups and blocked isocyanate groups or OH groups and methylol ether groups may be contained in the same binder. In the case of two-component binders, (e.g., hydroxy- and isocyanate-functional or epoxy- and amino-functional), the functional groups A and B that react with one another must be contained in separate binders.

At this juncture a more detailed discussion should take place once again about the case where the further reactive functional groups A or B are groups having olefinic double bonds, e.g., acryloyl groups. A combined cross-linking mechanism should be taken to mean here that, after free-radical polymerization of the olefinic double bonds initiated by NIR irradiation, optionally remaining unreacted double bonds may continue to react with appropriate reactive groups, e.g., amino groups. Double bonds that have not reacted after NIR irradiation may occur, for example, on coated places which have been unexposed or insufficiently exposed to NIR radiation, e.g., due to a complicated substrate geometry.

Variant 2

The coating compositions that can be used in the process according to the invention may, according to variant 2, contain one or more binders that contain both olefinic double bonds capable of free-radical polymerization and further functional groups cross-linkable by addition and/or condensation reactions. These binders may be, for example, the binders having double bonds already described above that were modified with other appropriate further functional groups A and/or B of the kind already enumerated above. Methods for the preparation of binders with double bonds capable of free-radical polymerization and further functional groups are known to the skilled person.

Variant 3

The binders that may be used according to variant 3, namely binders having olefinic double bonds and further reactive functional groups A and binders having further reactive functional groups B, are those of the kind already described above in the explanation of variants 1 and 2, only in combination with other binders.

Variant 4

The binders that may be used according to variant 4, namely binders having olefinic double bonds and further reactive functional groups A and B, are those of the kind already described above in the explanation of variant 2, but not in combination with other binders.

The binders of variant 4 only include functional groups of one-component binders.

The resin solids of the coating compositions that can be cross-linked by chemical means by free-radical polymerization of olefinic double bonds and by addition and/or condensation reactions include the binder system having olefinic double bonds capable of free-radical polymerization and having functional groups cross-linkable by chemical means by addition and/or condensation reactions, wherein the olefinic double bonds and further reactive functional groups may be contained in the same and/or separate binders. The resin solids of the coating compositions which may be used in the process according to the invention may also contain physically drying binders. The term physically drying binders means those binders which cure solely by the release of solvent from the applied coating layer. Physically drying solvent-based or water-thinnable polyurethane, alkyd, polyester and/or polyacrylate resins and known to the skilled person may be used as physically drying binders.

The resin solids of the coating compositions that may be used in the process according to the invention may also, in addition, contain reactive thinners capable of free-radical polymerization and/or cross-linkable by chemical means by addition and/or condensation reactions. The resin solids of the coating compositions are composed, preferably, of 50 to 100 wt.% of binders capable of free-radical polymerization and cross-linkable by chemical means in the manner of an addition and/or condensation reaction, 0–30 wt.% of physically drying binders and 0–30 wt.% of reactive thinners, the percentages by weight totalling 100 wt.%.

The equivalent ratio of functional groups A to functional groups B may be 1:5 to 5:1, preferably, 1:3 to 3:1, particularly preferably, 1:1.5 to 1.5:1. Various reaction mechanisms listed above by way of example may be combined provided that they do not interfere with one another.

The molar ratio of olefinic double bonds to reactive functional groups A or B in the binder system may vary widely. It may be, for example 1:0.1 to 1:5, preferably 1:0.2 to 1:4.

The coating compositions which may be used in the process according to the invention may be coating compositions in liquid or powder form. Liquid coating compositions may be waterborne or solvent-based. They may contain water and/or organic solvents. In the case of waterborne coating compositions, the binders contained may be ionically or nonionically stabilized to obtain sufficient water thinnability. Alternatively or in addition, it is possible to obtain water thinnability by means of external emulsifiers.

The organic solvents optionally present in the liquid coating compositions are conventional coatings solvents. These may originate from the preparation of the binders or they are added separately. Examples of suitable solvents include monohydric or polyhydric alcohols, e.g., propanol, butanol, hexanol; glycol ethers or esters, e.g., diethylene glycol dialkyl ether, dipropylene glycol dialkyl ether, in each case with C1 to C6-alkyl, ethoxy propanol, butyl glycol; glycols, e.g., ethylene glycol, propylene glycol and oligomers thereof, N-methylpyrrolidone, and ketones, e.g., methyl ethyl ketone, acetone, cyclohexanone; esters such as butyl acetate, isobutyl acetate, amyl acetate, aromatic hydrocarbons, xylene, Solvesso® 100 (a mixture of aromatic hydrocarbons with a boiling range from 155 to 185° C.) and aliphatic hydrocarbons. If, in the case of waterborne coating compositions, organic solvents are used in addition, these are preferably water-miscible solvents.

The liquid coating compositions may be prepared in the conventional way by dispersing, mixing and/or homogenizing the individual constituents.

Coating compositions in powder form may be prepared, for example, by extruding the powder coating ready-formulated by dry mixing of all the required components in the form of a pasty melt, cooling the melt, rough comminution, fine grinding and followed by optional sieving to the desired particle fineness. The coating compositions in powder form may also be used as aqueous powder coating slurry.

In order to initiate free-radical polymerization, the coating compositions may contain free-radical initiators capable of thermal activation and which decompose at different temperatures, depending on the initiator type. Examples of such free-radical initiators include organic peroxides, organic azo compounds or C-C-splitting initiators, such as, dialkyl peroxides, peroxocarboxylic acids, peroxodicarbonates, peroxide esters, hydroperoxides, ketone peroxides, azodinitriles or benzpinacol silyl ether. Preferred use quantities of the free-radical initiators are from 0.1 to 5 wt. %, based on the resin solids.

Catalysts may also be contained in order to catalyse cross-linking taking place in the manner of an addition/condensation reaction. Examples of such catalysts include tin catalysts for OH/NCO cross-linking, e.g., dibutyltin dilaurate, Lewis bases for the Michael addition, e.g., amines, such as. diazabicyclooctane or amidines, such as, diazabicycloundecene and acid catalysts for epoxy/carboxy cross-linking, e.g., sulfonic acids.

The coating compositions that may be used in the process according to the invention may be unpigmented coatings, e.g., transparent clear coats or transparent sealing coatings or pigmented coatings. The term sealing coatings should be understood in this context to mean coating compositions that are applied to the external coating layer of a coated surface of a substrate in order to obtain, for example, a particular mar resistance of a coating.

The coating compositions may contain fillers and/or transparent and color- and/or special effect-imparting pigments. Suitable color-imparting pigments include all the conventional coating pigments of an organic or inorganic nature. Examples of inorganic or organic color-imparting pigments include titanium dioxide, micronized titanium dioxide, iron oxide pigments, carbon black, azo pigments, phthalocyanine pigments, quinacridone or pyrrolopyrrole pigments. Examples of special-effect pigments include metallic pigments, e.g., of aluminium, copper or other metals; interference pigments, such as, metal oxide-coated metallic pigments, e.g., titanium dioxide-coated or mixed oxide-coated aluminium, coated mica, such as, titanium dioxide-coated mica and graphite special-effect pigments. Soluble dyes may also be contained. Examples of suitable fillers include silica, aluminium silicate, barium sulfate, calcium carbonate and talc.

The coating compositions may also contain conventional coating additives. Examples of conventional coating additives include levelling agents, rheology-influencing agents, such as, fine-particle silica or polymeric urea compounds, thickeners, e.g., based on partially cross-linked carboxyl-functional polymers or polyurethanes, defoamers, wetting agents, anti-crater agents, degassing agents, antioxidants and light stabilizers based on HALS products and/or UV absorbers. The additives are used in conventional amounts known to the skilled person. The coating compositions are free from photoinitiators.

Generally speaking, the liquid coating compositions may be adjusted, if necessary, to spray viscosity prior to application with water and/or organic solvents.

If the coating compositions are two-component coating compositions, the components that react with one another are stored separately and mixed together only shortly before application.

The process according to the invention is, in particular, a process for multi-layer coating. The invention relates, therefore, preferably to a process for multi-layer coating of substrates by applying a top coat layer to a substrate coated with one or more coating layers, e.g., with a primer and/or filler layer, wherein the top coat layer is applied from a color- and/or special effect-imparting base coat coating composition and a clear coat coating composition or from a pigmented one-layer top coat coating compound, the top coat layer is optionally overcoated with a transparent sealing layer, and wherein at least one of the coating layers is prepared from coating composition containing a binder system having olefinic double bonds capable of free-radical polymerization and having reactive functional groups within the meaning of addition and/or condensation reactions, the resin solids content of which coating composition has a C=C equivalent weight from 300 to 10,000, preferably from 300 to 8,000, and curing of said coating layer(s) is carried out by irradiation with NIR radiation in the wave length range from 760 to 1500 nm.

The coating compositions that may be used in the process according to the invention may, therefore, be coating compositions for the preparation of one or more of the following coating layers of a one-layer or preferably a multi-layer composition: primer, filler, base coat, clear coat, one-layer top coat and sealing layer.

According to a preferred embodiment, the coating composition used in the process according to the invention is a clear coat coating composition based on a binder system capable of free-radical polymerization and cross-linkable by addition and/or condensation reactions, which is applied to a pigmented base coat layer in order to produce a clear coat layer.

According to a further preferred embodiment, the coating composition used in the process according to the invention is a one layer top coat coating composition based on a binder system capable of free-radical polymerization and cross-linkable by addition and/or condensation reactions, which is applied to a substrate coated with one or more coating layers, e.g., with a primer and/or filler layer in order to produce a pigmented top coat layer.

The coating compositions may be applied in the process according to the invention by conventional methods, preferably, by spray coating.

Suitable substrates include any substrates such as metal and plastic substrates, e.g., iron, zinc, aluminium, magnesium, refined steel or alloys thereof, and polyurethanes, polycarbonates or polyolefins.

When applying the coating compositions to be cured by NIR radiation, it is possible to proceed in such a way that, for example, the appropriate coating composition based on a binder system capable of free-radical polymerization and cross-linkable by addition and/or condensation reactions is applied initially to the relevant substrate. After application, flashing off may take place, e.g., within a period of 3 to 40 minutes at, e.g., 20° C. to 80° C. An advantage of the process according to the invention is, however, that a flash-off phase is not absolutely necessary prior to NIR irradiation. After the optionally interposed flash-off phase, irradiation with NIR radiation may then take place. Irradiation may be continuous or discontinuous (in cycles).

Irradiation may be carried out, for example, in a conveyor installation fitted with one or more NIR radiation emitters, or with one or more NIR radiation emitters positioned in front of the object to be irradiated or the place to be irradiated, or the substrate to be coated and/or the NIR radiation emitter(s) may be moved relative to one another during irradiation. For example, the substrate to be coated may be moved through an irradiation tunnel fitted with one or more NIR radiation emitters and/or a robot fitted with one or more NIR radiation emitters may guide the NIR radiation emitter(s) over the substrate surface.

In principle the irradiation time, distance from the object, radiation emitter surface temperature and/or radiation output of the NIR radiation emitter may be varied during NIR irradiation. The distance between the object and NIR radiation emitter may be, for example, 2 cm to 60 cm, the irradiation time may be, for example, from 1 s to 100 s, preferably not more than 60 s. The irradiation time refers either to the duration of continuous irradiation or to the sum of the periods of different irradiation cycles. By selecting the various parameters in a controlled manner, different surface temperatures of the irradiated surface may be obtained, for example surface temperatures from 80° C. to 250° C. The surface temperatures also may, however, be over 250° C.

Irradiation with NIR radiation may take place in one or more successive irradiation steps. That is, the energy to be introduced by irradiation may be introduced entirely in one irradiation step or in portions in two or more irradiation steps. If coating layers with a very high layer thickness are to be irradiated it is possible to proceed in such a way that, for example, the coating composition is applied in two or more spray operations and irradiation of the applied layer with NIR radiation takes place after each spray operation.

Drying or curing of the coating layers applied in the preferred process of the invention for multi-layer coating may take place in various ways. If, for example, two coating layers are applied successively in each case from coating composition based on a binder system capable of free-radical polymerization and cross-linkable by addition and/or condensation reactions and which are to be cured by NIR radiation, the first coating layer, e.g., a base coat layer may be applied initially and irradiated with NIR radiation. In the next step, the second coating layer, e.g., a clear coat layer, may be applied and in turn irradiated with NIR radiation. Alternatively, it is also possible to apply both coating layers wet in wet, optionally with an interposed flash-off phase and to cure both coating layers together, e.g., a complete base coat/clear coat composition, with one or more NIR irradiation steps.

A similar procedure is also conceivable, for example, when applying a single-layer top coat from a coating composition based on a binder system capable of free-radical polymerization and cross-linkable by addition and/or condensation reactions to a filler coating composed of a coating agent based on a binder system capable of free-radical polymerization and cross-linkable by addition and/or condensation reactions.

If a coating composition based on a binder system capable of free-radical polymerization and cross-linkable by addition and/or condensation reactions which is to be cured by NIR radiation, e.g., a clear coat coating compound, is applied to a coating layer composed of a further chemically cross-linking and/or physically drying coating composition, which is not to be cured with NIR radiation, e.g., a base coat coating compound, then the base coat coating compound, e.g., may be applied initially and cured at temperatures of, for example, 20° C.–160° C. The clear coat coating composition may then be applied and the resulting clear coat coating irradiated with NIR radiation. It is also possible, however, to apply the clear coat coating composition wet in wet to the base coat layer, optionally after a flash-off phase, and then to carry out NIR irradiation.

It is also possible to apply any chemically cross-linking and/or physically drying coating composition but which contains no binders capable of free-radical polymerization, e.g., as a base coat coating compound, to irradiate said compound with NIR radiation and then to apply and cure a clear coat coating composition in accordance with the process of the invention.

In order to cure the coating compositions based on binders capable of free-radical polymerization and cross-linkable by addition and/or condensation reactions within the scope of the process of the invention it may prove advantageous, in addition to NIR irradiation, to apply heat, e.g., after NIR irradiation, optionally to a restricted area, in order to obtain full curing of the entire coating surface.

If coating compositions that do not conform with the coating compositions to be cured according to the invention with NIR radiation based on a binder system capable of free-radical polymerization and cross-linkable by addition and/or condensation reactions are also used in the process of the invention, then said coating compositions may be solvent-based, waterborne or powder coating compositions.

The process according to the invention may find application in industrial and automotive coating, in the latter case both in automotive OEM finishing and in automotive refinishing.

The process according to the invention permits, within a few seconds to minutes, rapid curing of coating layers from coating compositions based on a binder system capable of free-radical polymerization and cross-linkable by addition and/or condensation reactions. Compared with the curing of coating compositions based on binders that can be cured with free-radicals and photoinitiators by means of UV radiation, and compared with dual cure systems that can be cured by means of UV radiation, coatings with a lower initial yellowing are obtained by the process according to the invention. Moreover, fully cured coatings are obtained with the process of the invention, even if radical scavengers e.g., light stabilizers based on HALS products, are used in the coating compositions employed. Sufficient curing may also be obtained on those places of the coated substrate that are unexposed or insufficiently exposed to NIR radiation, e.g., coated substrate reverse sides or hollows. Pigmented and unpigmented coatings with very good hardness and surface quality are obtained with the process according to the invention. A further advantage of the process of the invention is that the use of thermal radical initiators in the coating compositions may also be dispensed with in order to obtain the above-mentioned properties. In view of the non-yellowing or low-yellowing coatings that may be obtained with the process according to the invention and the possibility of using light stabilizers based on HALS products without having to accept the known disadvantages, the process according to the invention may be used particularly advantageously to produce clear coat or pigmented top coat layers as the outer coating layers of a coating composition.

The invention will be explained in more detail on the basis of the examples below.

EXAMPLES

Example 1

Preparation of Clear Coats 1–2

Clear coats (CC 1–2) having the composition given in Table 1 were prepared from binders capable of free-radical polymerization, OH-functional binders and polyisocyanates. The clear coats contained in each case light stabilizers based on HALS products.

CC 1: with thermal radical initiator

CC 2: with photoinitiator

TABLE 1

| Constituent | CC1 | CC2 |
|---|---|---|
| Setal 1715 VX-74 (1) | 62.7 | 62.7 |
| Ebecryl 5129 (2) | 33.6 | 33.6 |
| Tinuvin ® 400 (3) | 1.3 | 1.3 |
| Tinuvin ® 292 (4) | 1.3 | 1.3 |
| Ebecryl 350 (5) | 0.2 | 0.2 |
| Vazo ® 88 (6) | 0.9 | |
| Darocur 1173 (7) | | 0.9 |
| | 100 | 100 |
| Desmodur ® N 3390 BA (91% in butylacetate) (8) | 28 | 28 |

(1) commercial OH-functional polyester binder, OH-number 145 mg KOH/g (Akzo)
(2) commercial urethane acrylate binder capable of free-radical polymerization (UCB)
(3) commercial UV absorber (2-hydroxyphenyl triazine) (CIBA,)
(4) commercial HALS product (hindered amine) (CIBA)
(5) commercial leveling agent (acrylized silicone derivative) (UCB)
(6) commercial radical initiator (azo compound) (DuPont)
(7) commercial photoinitiator (2-hydroxy-2-methyl-1-phenyl-propan-1-one) (CIBA)
(8) commercial isocyanate hardener based on hexamethylene diisoyanate (Bayer)

The details in the table relate to parts by weight. The clear coats thus prepared were adjusted to spray viscosity with butyl acetate.

Example 2

Application and curing of clear coats 1–2

Clear coats 1–2 from Example 1 were applied to both sides of test sheets coated on both sides with black base coat by spraying in resulting dry layer thicknesses of about 30 μm. The clear coats were then flashed off for 10 min in each case at 80° C.

Determination of curing

The applied clear coat 1 on the upper side of the test sheet was irradiated according to the invention with a commercial NIR radiation emitter (High-Burn radiation emitter from Adphos, 400 kW/m², output 100%) for 7 seconds at a radiation emitter/object distance of 10 cm:

For comparison purposes:
(a) The applied clear coat 1 was cured in an oven for 20 minutes at 145° C.
(b) The applied clear coat 2 was irradiated on the upper side of the test sheet with a commercial UV radiation emitter (Hg medium-pressure radiation emitter from Fusion, 240 W/cm, output 100%) for 3 seconds at a radiation emitter/object distance of 11 cm.
(c) The applied clear coat 2 was cured in an oven for 20 minutes at 145° C. and then irradiated on the upper side of the test sheet with a commercial UV radiation emitter (Hg medium-pressure radiation emitter from Fusion, 240 W/cm, output 100%) for 3 seconds at a radiation emitter/object distance of 11 cm.

In order to determine curing, the König pendulum hardness (PH) was determined to DIN 53 157. The results are shown in Table 2.

TABLE 2

| | Clear coat | Curing | Side | PH |
|---|---|---|---|---|
| acc. to invention | CC 1 | NIR | Upper side | 84 |
| | | | Under side | 75 |
| Comparison a) | CC 1 | Oven | Upper side | 23 |
| | | | Under side | 23 |
| Comparison b) | CC 2 | UV | Upper side | 27 |
| | | | Under side | sticks |
| Comparison c) | CC 2 | Oven + UV | Upper side | 68 |
| | | | Under side | 28 |

The clear coat 1 with HALS products irradiated with NIR radiation according to the process of the invention (whereby only the upper side of the test sheet was irradiated) exhibited sufficient curing of the clear coat both on the irradiated upper side of the test sheet coated with clear coat and on the non irradiated under side of the test sheet coated with clear coat. In comparison, clear coat 1 (Comparison a) cured thermally in an oven exhibited completely insufficient curing on the upper and under side. Moreover, clear coat 2 with HALS products irradiated with UV radiation (whereby only the upper side of the test sheet was irradiated) (Comparison b) exhibited insufficient curing of the clear coat on the irradiated upper side of the test sheet coated with clear coat. No curing took place on the non irradiated under side of the test sheet coated with clear coat, the coating remained tacky, so the pendulum hardness could not be determined. Clear coat 2 (Comparison a) initially cured thermally in the oven and then irradiated with UV radiation on the upper side of the test sheet exhibited curing on the upper side which was not quite as good as that of clear coat 1 cured in only one step by the process of the invention, and completely insufficient curing on the under side.

Example 3

Preparation of clear coats 3–4

Clear coats (CC 3–4) having the composition given in Table 3 were prepared with a binder containing unsaturated groups capable of free-radical polymerization and hydroxyl groups and polyisocyanates. The clear coats contained light stabilizers based on HALS products.

CC 3: with thermal radical initiator
CC 4: with photoinitiator

TABLE 3

| Constituent | CC 3 | CC 4 | CC 5 |
|---|---|---|---|
| IRR 351 (1) | 40.4 | 40.4 | 40.4 |
| Tinuvin ® 292 (2) | 0.6 | 0.6 | 0.6 |
| Tinuvin ® 400 (3) | 1.1 | 1.1 | 1.1 |
| Ebecryl 350 (4) | 0.2 | 0.2 | 0.2 |
| Initiator BK (5) | 0.6 | | 0.6 |
| Darocur 1173 (6) | | 1.6 | 1.6 |
| Ethoxy propyl acetate | 29.7 | 28.7 | 28.7 |
| Butyl acetate | 27.4 | 27.4 | 26.8 |
| | 100 | 100 | 100 |
| Desmodur ® N 3390 BA (91% in butyl acetate) (7) | 25 | 25 | 25 |

(1) commercial urethane acrylate, OH-number 75–90 mg KOH/g (UCB)
(2) commercial HALS product (hindered amine) (CIBA)
(3) commercial UV absorber (2-hydroxyphenyl triazine) (CIBA,)
(4) commercial leveling agent (acrylized silicone derivative) (UCB)
(5) commercial radical initiator (C-C cleaver) (Bayer)
(6) commercial photoinitiator (2-hydroxy-2-methyl-1-phenyl-propan-1-one) (CIBA)
(7) commercial isocyanate hardener based on hexamethylene diisocyanate (Bayer)

The details in the Table relate to parts by weight. The clear coats thus prepared were adjusted to spray viscosity with butyl acetate.

Example 4

Application and curing of clear coats 3–4

Clear coats 3 and 4 from Example 3 were applied on both sides to test sheets coated on both sides with silver base coat by spraying in a resulting dry layer thicknesses of about 40 μm. The clear coats were then flashed off for 10 min in each case at 80° C.

Determination of curing

The applied clear coat 3 on the upper side of the test sheet was irradiated with a commercial NIR radiation emitter (High-Bum radiation emitter from Adphos, 400 kW/m², output 100%) for 17 seconds at a radiation emitter/object distance of 10 cm.

For comparison purposes,:

(a) The applied clear coat 3 was cured in an oven for 20 minutes at 140° C.

(b) The applied clear coat 4 was irradiated on the upper side of the test sheet with a commercial UV radiation emitter (Hg medium-pressure radiation emitter from Fusion, 240 W/cm, output 100%) for 3 seconds at a radiation emitter/object distance of 11 cm.

(c) The applied clear coat 4 was cured in an oven for 20 minutes at 140° C. and the upper side of the test sheet was then irradiated with a commercial UV radiation emitter (Hg medium-pressure radiation emitter from Fusion, 240 W/cm, output 100%) for 3 seconds at a radiation emitter/object distance of 11 cm.

In order to determine curing, the König pendulum hardness (PH) was determined to DIN 53 157. After a xylene test (XyT), the pendulum hardness was determined again after 15 minutes and after 2 hours. The xylene test was carried out by placing a filter paper soaked with xylene on the cured clear coat layer for 10 min in each case and covering it with a Petri dish. The xylene was then wiped off with a paper towel.

The results are shown in Table 4.

TABLE 4

| | Curing | Side | PH | PH after XyT after 15 min | PH after XyT after 2 h |
|---|---|---|---|---|---|
| Acc. to invention CC3 | NIR | Upper | 112 | m 106 | 111 |
| | | Under | 110 | m 102 | 106 |
| Comparison d) CC3 | Oven | Upper | 15 | m 17 | m 17 |
| | | Under | 15 | m 19 | m 15 |
| Comparison b) CC4 | UV | Upper | 27 | m 30 | m 30 |
| | | Under | sticks | sticks | sticks |
| Comparison f) CC4 | Oven + UV | Upper | 114 | m 118 | 120 |
| | | Under | 15 | m 15 | m 19 | m: Marking was observed

The results obtained may be interpreted in a similar way to the results according to Table 2, except to add that comparable hardness results were obtained in each case after the xylene test and without the xylene test. The good curing result of the clear coats irradiated according to the invention also remained unaffected after the xylene test.

Determination of the mar resistance of the cured clear coats from Table 4

The mar resistance of the cured samples (PH>100) was tested in the following manner:

A square piece of felt (3 cm×5 cm) was coated with 1.5 g of grinding paste (Standohyd fine polishing paste (Standox GmbH) diluted with water: 50 g paste+5 g water). The felt was placed on the coated sheet, weighted with a 2 kg weight and drawn horizontally to and fro 20 times over a distance of 13 cm. The gloss before and after scratching was measured at an angle of 20° as a measure of mar resistance (micro-TRI-gloss, BYK-Gardener). The residual gloss in % is given in Table 5.

TABLE 5

| | Curing | Side | Residual gloss |
|---|---|---|---|
| acc. to invention CC3 | NIR | Upper | 41 |
| | | Under | 42 |
| Comparison f) CC4 | Oven + UV | Upper | 42 |

Clear coats cured by the process according to the invention and clear coats cured thermally in an oven and with UV radiation in 2 steps exhibited a comparably good quality in terms of mar resistance.

What we claim is:

1. A process for coating a substrate which comprises
   (a) applying at least one layer of a coating composition to a substrate; wherein the coating composition comprises a binder system having olefinic double bonds capable of free-radical polymerization and having reactive functional groups, within the meaning of addition and/or condensation reactions, the resin solids of said coating composition having a C=C-equivalent weight from 300 to 10,000; and
   (b) curing the layer of coating composition by irradiation of the layer with NIR radiation in the wave length range of 760–1500 nm.

2. The process according to claim 1, whereby the process forms a multi-layer coating on a substrate by applying a top coat layer to a substrate that has been coated with at least one coating layer, whereby the top coat layer comprises a color and/or special effect-imparting base coat coating composition and a clear coat coating composition applied over the base coat coating composition and whereby at least one of the coating layers being produced from a coating composition which comprises a binder system having olefinic double bonds capable of free-radical polymerization and having reactive functional groups, within the meaning of addition and/or condensation reactions, the resin solids of said coating composition having a C=C-equivalent weight from 300 to 10,000; and curing of the coating layer(s) is carried out by irradiation with NIR radiation in the wave length range of 760–1500 nm.

3. The process according to claim 1, whereby the process forms a multi-layer coating on a substrate by applying a top coat layer to a substrate that has been coated with at least one coating layer, whereby the top coat layer comprises a pigmented one-layer top coat coating composition and whereby at least one of the coating layers being produced from a coating composition which comprises a binder system having olefinic double bonds capable of free-radical polymerization and having reactive functional groups, within the meaning of addition and/or condensation reactions, the resin solids of said coating composition having a C=C-equivalent weight from 300 to 10,000; and curing of the coating layer(s) is carried out by irradiation with NIR radiation in the wave length range of 760–1500 nm.

4. The process according to claim 1, wherein the coating composition comprises a binder system having olefinic double bonds capable of free-radical polymerization and having reactive functional groups, within the meaning of addition and/or condensation reactions, the resin solids of said coating composition having a C=C-equivalent weight from 300 to 8,000.

5. The process according to claim 1, wherein curing of the coating layer is carried out by irradiation with NIR radiation in the wave length range of 760–1200 nm.

6. The process according to claim 1, wherein irradiation of the coating layer is carried out with NIR radiation emitters having an intensity (radiation output per unit area) from 10 kW/m$^2$ to 15 MW/m$^2$.

7. The process according to claim 1, wherein irradiation of the coating layer is carried out with NIR radiation emitters which have a radiation emitter surface temperature (coil filament temperature) from 2000 to 3500 K.

8. The process according to claim 1, wherein the coating composition comprising a binder system having olefinic double bonds capable of free-radical polymerization and having reactive functional groups within the meaning of addition and/or condensation reactions contains radical scavengers.

9. The process according to claim 1, wherein the coating composition comprising a binder system having olefinic double bonds capable of free-radical polymerization and having reactive functional groups within the meaning of addition and/or condensation reactions is a clear coat coating composition.

10. The process according to claim 1, wherein the coating composition comprising a binder system having olefinic double bonds capable of free-radical polymerization and having reactive functional groups within the meaning of addition and/or condensation reactions is a pigmented one-layer top coat coating composition.

11. The process according to claim 1, wherein it is a process for automotive, automotive part and/or industrial coating.

* * * * *